(12) United States Patent
Lewis et al.

(10) Patent No.: US 11,007,670 B2
(45) Date of Patent: *May 18, 2021

(54) MANUFACTURED WOOD PRODUCTS AND METHODS OF PRODUCTION

(71) Applicant: 3RT Holding Pty Ltd, Hampton (AU)

(72) Inventors: David A. Lewis, Marion (AU); Jonathan Andrew Campbell, Magill (AU); Rebecca Esther Norman, Oaklands Park (AU)

(73) Assignee: 3RT Holding Pty Ltd., Hampton (AU)

( * ) Notice: Subject to any disclaimer, the term of this patent is extended or adjusted under 35 U.S.C. 154(b) by 0 days.

This patent is subject to a terminal disclaimer.

(21) Appl. No.: 16/518,743

(22) Filed: Jul. 22, 2019

(65) Prior Publication Data

US 2020/0009760 A1 Jan. 9, 2020

Related U.S. Application Data (63) Continuation of application No. 15/747,138, filed as application No. PCT/AU2016/000262 on Jul. 22, 2016, now Pat. No. 10,357,896.

(30) Foreign Application Priority Data

Jul. 23, 2015 (AU) ................................ 2015902938

(51) Int. Cl.
*B27N 3/18* (2006.01)
*B32B 7/04* (2019.01)
(Continued)

(52) U.S. Cl.
CPC ............... *B27N 3/18* (2013.01); *B27N 3/002* (2013.01); *B32B 7/04* (2013.01); *B32B 7/12* (2013.01);
(Continued)

(58) Field of Classification Search
None
See application file for complete search history.

(56) References Cited

U.S. PATENT DOCUMENTS 6,599,455 B2 7/2003 Wierer et al.
6,605,245 B1 * 8/2003 Dubelsten .............. B27N 3/007
264/112

(Continued)

FOREIGN PATENT DOCUMENTS

JP 2001-26760 A 1/2001
JP 2005-219442 A 8/2005

OTHER PUBLICATIONS

International Search Report dated Oct. 17, 2016, issued in corresponding International Application No. PCT/AU2016/000262, filed Jul. 22, 2016, 13 pages.

*Primary Examiner* — Mary Lynn F Theisen
(74) *Attorney, Agent, or Firm* — Christensen O'Connor Johnson Kindness PLLC (57) ABSTRACT

A process of producing a manufactured wood product comprises providing a plurality of wood pieces having substantially an equilibrium moisture content; contacting the plurality of wood pieces with one or more additives under conditions for the additive(s) to soak into the wood pieces; applying a thermoplastic adhesive comprising a thermoplastic resin and a crosslinking agent to the wood pieces to form adhesive coated wood pieces; optionally heating the adhesive coated wood pieces to form heated adhesive coated wood pieces; assembling the adhesive coated wood pieces in a desirable configuration to form assembled adhesive coated wood pieces; compressing the assembled adhesive coated wood pieces in a press at a pressure and for a time sufficient to compact and compress the assembled wood pieces to force trapped air out of and mechanically deform the assembled adhesive coated wood pieces so that adjacent (Continued)

wood pieces conform to the shape of one another; crosslinking the thermoplastic adhesive to at least a critical crosslinking amount during the compression step to form an at least partially cured manufactured wood product, wherein the critical crosslinking amount is sufficient such that the at least partially cured manufactured wood product substantially maintains its compressed form and prevents the wood pieces expanding and returning to their initial state upon release of pressure in the compression step; removing the at least partially cured manufactured wood product from the press; and optionally, further curing the partially cured manufactured wood product to provide the manufactured wood product having substantially an equilibrium moisture content.

20 Claims, 4 Drawing Sheets

(51) Int. Cl.
*B32B 7/12* (2006.01)
*B32B 21/13* (2006.01)
*B27N 3/00* (2006.01)
*B27N 3/04* (2006.01)
*B27N 7/00* (2006.01)

(52) U.S. Cl.
CPC ............... *B32B 21/13* (2013.01); *B27N 3/04* (2013.01); *B27N 7/005* (2013.01); *B32B 2255/08* (2013.01); *B32B 2255/26* (2013.01); *B32B 2307/732* (2013.01)

(56) References Cited

U.S. PATENT DOCUMENTS

| 2002/0074095 | A1 | 6/2002 | Wierer et al. | |
|---|---|---|---|---|
| 2015/0073070 | A1* | 3/2015 | Huang | B27N 3/002 524/14 |
| 2015/0151449 | A1* | 6/2015 | Birkeland | B27N 3/002 428/106 |

* cited by examiner

MANUFACTURED WOOD PRODUCTS AND METHODS OF PRODUCTION

CROSS-REFERENCES TO RELATED APPLICATIONS

This application is a continuation of U.S. patent application Ser. No. 15/747,138, filed on Jan. 23, 2018, now U.S. patent Ser. No. 10/357,896, which is the National Stage of International Application No. PCT/AU2016/000262, filed on Jul. 22, 2016, which claims priority from Australian Provisional Patent Application No. 2015902938, filed on 23 Jul. 2015, all the disclosures of which are incorporated by reference herein.

TECHNICAL FIELD

The present disclosure relates to manufactured wood products. In one particular form, the present disclosure relates to manufactured wood flooring products.

BACKGROUND

Natural wood has been used for construction and building for many years. However, in more recent times demand for wood, especially hardwoods and exotic species, has increased and this has led to more widespread deforestation and unrestrained logging which has reduced the availability of natural wood and adversely affected the environment.

For these reasons, attention has turned to composite or manufactured wood products that are manufactured using recycled, inexpensive and/or more readily available wood materials. Many of these newer wood products are suitable for use in buildings and construction when they are not visible (i.e. "inner surface" uses), such as in structural boards, beams or panels in buildings. Production of manufactured wood products designed for outer surface use, such as floor boards or wall panels, is more difficult because both the physical properties (hardness, durability, etc.) and aesthetic appearance of the products have to be suited to the end use. In these products, the natural look and texture of a wood grain is the principal appeal of the wood product.

In the flooring industry, specific species of hardwood are generally more popular and preferred over other species due to the natural hardness, density and visual appeal of a particular wood. For flooring, preferred hardwoods include jarrah, red oak, beech, blue gum, etc. Unfortunately, a considerable amount of waste wood material is generated when raw lumber is processed into wood flooring products and from plantation forests that are currently being used for sustainable timber production. For this reason, attention has turned to manufactured wood products for use in flooring and related applications. More recently, attention has turned to the use of less desirable wood species to form aesthetically pleasing manufactured wood products, such as floor boards. For example, U.S. Pat. No. 8,268,430 discloses a method for producing a manufactured wood product having a natural wood grain appearance using less desirable or discarded natural wood pieces. Manufactured wood products formed in this way may have an aesthetically pleasing appearance but, in some cases, the physical properties (such as modulus of elasticity ("MOE") and modulus of rupture ("MOR")) may not be ideal. United States Patent publication No. 20100178451 discloses a method for producing manufactured wood products using bamboo. These products are referred to as "strand woven bamboo flooring" and have many desirable physical properties. For example, the manufactured wood products are considerably harder than products made from other wood species and this makes them ideally suited to flooring applications.

It is clear from the prior art that the physical properties of many of the known manufactured wood products is heavily influenced by the type of wood used.

Manufactured wood products are typically produced by providing a plurality of wood strips, chips, fibres or pieces, covering or impregnating the wood strips, chips, fibres or pieces with an adhesive, optionally drying the adhesive (depending on the adhesive), arranging the wood strips, chips, fibres or pieces in a mould or feeding them to a continuous system, applying pressure and curing the resin. Adhesives that are commonly used in this process are urea formaldehyde resins, phenol formaldehyde resins, melamine formaldehyde resins, methylene diphenyl diisocyanate resins and polyurethane resins. However, there are difficulties associated with many of these resins. A serious disadvantage of urea formaldehyde, phenol formaldehyde and melamine formaldehyde resins is that products formed using these materials slowly emit formaldehyde into the surrounding environment. These emissions are commonly referred to as the Volatile Organic Compounds (VOCs). Due to environmental, health, and regulatory issues related to formaldehyde emissions from wood products, alternative resins are needed. Recent legislation has prohibited or severely restricted the use of formaldehyde in some countries or states. Phenol formaldehyde resins have been used for the production of manufactured wood products for many years and it has become evident that the resin yellows over time and this adversely affects the appearance of the product. Furthermore, in practice, the quality of products formed using these resins can be adversely influenced by incomplete cure/conversion of the monomers during product manufacture. Urea formaldehyde resins are not waterproof and this can present problems with many flooring applications. Methylene diphenyl diisocyanate and polyurethane resins do not contain formaldehyde and are generally waterproof but they are considerably more expensive to use and have the further disadvantages that they are highly reactive which makes curing difficult to control and the physical properties of manufactured wood products made using these resin are highly dependent on the moisture content of the wood being processed.

United States Patent publication No. 20020074095 discloses a process for producing wood particleboard by bonding wood fibres using a crosslinkable binder. The wood fibres are prepared by breaking down wood particles and the resultant fibres are mixed with about 15% by weight binder and compacted to form a particleboard product. However, the particleboard product formed is a composite particleboard and does not have any natural look and texture of the wood pieces from which it is formed. Furthermore, the physical properties of the particleboard product are a composite of the physical properties of the wood fibres used and the adhesive used. In other words, the adhesive used contributes significantly to the physical and aesthetic properties of the product.

Current processes for producing manufactured wood products tend to be very dependent on the moisture content of the wood being processed. Variations in the moisture content of starting wood materials tend to be addressed by drying the wood pieces to a low predetermined level of moisture. However, this is an energy and labour intensive process that provides a fundamental limitation to the commercial viability of manufacturing these products in many jurisdictions and for many potentially desirable wood species. Variability of moisture content during the various stages of production can also lead to warping of the product after production. Thus, the types of adhesives that have been explored to date have fundamental issues with manufacturability of these products and, to date, this has limited the broader exploitation of known manufacturing methods.

There is thus a need for a new approach to the manufacture of wood products that improve the viability of manufacture. Alternatively, or in addition, there is a need for a new approach to the manufacture of wood products that impart favourable physical properties on the end product. Alternatively, or in addition, there is a need for a new approach to the manufacture of wood products that results in a manufactured wood product that has a natural look and texture of wood grain. Alternatively, or in addition, there is a need for a new approach to the manufacture of wood products that is more environmentally or economically sustainable than prior art processes. Alternatively, or in addition, there is a need to provide resins and/or processes for use in the production of manufactured wood products that overcome one or more of the difficulties associated with known resins.

SUMMARY

In a first aspect, disclosed herein is a process of producing a manufactured wood product comprising:

providing a plurality of wood pieces having substantially an equilibrium moisture content;

contacting the plurality of wood pieces with one or more additives under conditions for the additive(s) to soak into the wood pieces;

applying a thermoplastic adhesive comprising a thermoplastic resin and a crosslinking agent to the wood pieces to form adhesive coated wood pieces;

optionally heating the adhesive coated wood pieces to form heated adhesive coated wood pieces;

assembling the adhesive coated wood pieces in a desirable configuration to form assembled adhesive coated wood pieces;

compressing the assembled adhesive coated wood pieces in a press at a pressure and for a time sufficient to compact and compress the assembled wood pieces to force trapped air out of and mechanically deform the assembled adhesive coated wood pieces so that adjacent wood pieces conform to the shape of one another;

crosslinking the thermoplastic adhesive to at least a critical crosslinking amount during the compression step to form an at least partially cured manufactured wood product, wherein the critical crosslinking amount is sufficient such that the at least partially cured manufactured wood product substantially maintains its compressed form and prevents the wood pieces expanding and returning to their initial state upon release of pressure in the compression step;

removing the at least partially cured manufactured wood product from the press; and optionally, further curing the partially cured manufactured wood product to provide the manufactured wood product having substantially an equilibrium moisture content.

In a second aspect, disclosed herein is a process of producing a manufactured wood product comprising:

providing a plurality of wood pieces having substantially an equilibrium moisture content;

applying a thermoplastic adhesive comprising a thermoplastic resin and a crosslinking agent to the wood pieces to form adhesive coated wood pieces;

optionally heating the adhesive coated wood pieces to form heated adhesive coated wood pieces;

assembling the adhesive coated wood pieces in a mould or a press having a length, wherein a majority of the wood pieces are assembled with the fibre direction of the wood pieces substantially aligned with the length of the mould or press to form assembled adhesive coated wood pieces;

compressing the assembled adhesive coated wood pieces in a press in a direction and at a pressure and for a time sufficient to compact and compress the assembled wood pieces to force trapped air out of and mechanically deform the assembled adhesive coated wood pieces so that adjacent wood pieces conform to the shape of one another and alter the configuration of the wood pieces in the compressed block such that the wood pieces within the compressed block are in a different configuration to that of the assembled wood pieces;

crosslinking the thermoplastic adhesive to at least a critical crosslinking amount during the compression step to form an at least partially cured manufactured wood product, wherein the critical crosslinking amount is sufficient such that the at least partially cured manufactured wood product substantially maintains its compressed form and prevents the wood pieces expanding and returning to their initial state upon release of pressure in the compression step;

removing the at least partially cured manufactured wood product from the press; and optionally, further curing the partially cured manufactured wood product to provide the manufactured wood product having substantially an equilibrium moisture content.

In a third aspect, disclosed herein is a manufactured wood product formed by the process of either the first aspect or the second aspect.

In certain embodiments, the manufactured wood product is selected from the group consisting of engineered wood boards, wood-containing composite boards, fibreboards, oriented strand boards, particle boards, and floor boards.

In certain embodiments, the manufactured wood product is suitable for outer surface use and has desirable physical properties and aesthetic appearance suited to the end use.

In certain embodiments, the crosslinked thermoplastic adhesive in the manufactured wood product has a glass transition temperature of less than about 70 degrees Celsius, less than about 50 degrees Celsius, less than about 40 degrees Celsius, less than about 30 degrees Celsius or less than about 20 degrees Celsius. In certain specific embodiments, the crosslinked thermoplastic adhesive in the manufactured wood product has a glass transition temperature of from about −30 degrees Celsius to about 25 degrees Celsius. In certain specific embodiments, the crosslinked thermoplastic adhesive in the manufactured wood product has a glass transition temperature lower than room temperature.

In certain embodiments, the manufactured wood product comprises less than 15% (w/w) adhesive, less than 10% (w/w) adhesive or less than 6% (w/w) adhesive.

In certain embodiments, the wood pieces have a thickness that is less than a critical thickness at which their own mechanical properties cannot overcome adhesion between the wood and the adhesive and/or the cohesive strength of the adhesive and cause the structure to delaminate when the wood pieces are allowed to expand.

In embodiments, the wood pieces have a maximum thickness of from about 0.1 mm to about 10 mm. For example, the wood pieces may have a maximum thickness of about 10 mm, about 8 mm, about 6 mm, about 5 mm, about 4 mm, about 3 mm, about 2 mm, about 1 mm, about 0.5 mm, about 0.3 mm or about 0.1 mm. In certain embodiments, the wood pieces have a maximum thickness of from about 2 mm to about 10 mm.

In certain embodiments, the wood for the natural wood pieces is selected from the group consisting of eucalypt, pine, red maple, white maple, Queensland maple, ash, aspen, walnut, oak, redwood, birchwood, mahogany, ebony, cherry wood, oregon, poplar and grasses such as bamboo. The wood for the natural wood pieces may be a combination of two or more of these species.

In certain embodiments, the wood is pine.

In certain embodiments, the wood is eucalypt.

In certain embodiments, the wood pieces are derived from low value woods.

In certain embodiments, the equilibrium moisture content of the plurality of natural wood pieces is from about 5% to about 15% (w/w) for pine.

In certain embodiments, the equilibrium moisture content of the plurality of natural wood pieces is from about 8% to about 12% for hardwood species.

In certain embodiments, the thermoplastic resin is a polyvinyl ester.

In certain embodiments, the thermoplastic resin is polyvinyl acetate or a copolymer or a hydrolysed form thereof.

In certain embodiments, the crosslinking agent is a catalyst or a reactive agent selected from the group consisting of N-methylolacrylamide, borax, aluminum zirconium carbonates, aluminum chloride, magnesium chloride, p-toluene sulfonic acid, acetaldehyde, formaldehyde, urea-formaldehyde, melamine-formaldehyde, trimethylolmelamine, cupric ammonium complexes, chromium complexes, organic titanates, dichromates, polyaldehyde, butyraldehyde, chloroformate esters, urea, isocyanates, and ammonium zirconium carbonates. Optionally, the thermoplastic adhesive is crosslinked by ethoxylation, propoxylation, cyanoethylation, exposure to gamma radiation or e-beam crosslinking.

In certain specific embodiments, the crosslinking agent is aluminum chloride. In other specific embodiments, the crosslinking agent is p-toluene sulfonic acid.

In certain embodiments, the thermoplastic adhesive comprising the thermoplastic resin and the crosslinking agent is a water based emulsion.

In certain embodiments, the thermoplastic adhesive is applied to the wood pieces by hand, brush, spray, roller, machine, dipping and/or a curtain/extrusion coater.

The thermoplastic resin and crosslinking agent can be applied to the wood pieces together (i.e. simultaneously) or separately.

In certain embodiments, the adhesive comprises one or more additives selected from the group consisting of swell control agents, fungicides, insecticides, coloring agents, UV stabilizers, fillers, extenders, fire resistant agents, fire retardants, fibres, and the like.

In certain embodiments, the wood can be treated prior to the application of the adhesive to obtain different properties. For example, the color of the wood can be changed by thermal treatment, stains or dyes and/or additives selected from the group consisting of swell control agents, fungicides, insecticides, coloring agents, UV stabilizers, fillers, extenders, fire resistant agents, fire retardants, fibres, and the like can be applied to the wood prior to application of the adhesive.

In certain embodiments, the adhesive coated wood pieces are heated to dry the adhesive and maintain a substantially equilibrium moisture content in the adhesive coated wood pieces.

In certain embodiments, the adhesive coated wood pieces are preheated prior to assembling them in a desirable configuration and compressing.

In certain embodiments, the adhesive coated wood pieces are heated to a temperature of from about 50° C. to about 200° C.

In certain embodiments, the adhesive coated wood pieces are heated for a period of from about 1 minute to about 40 minutes.

In certain embodiments, the dried adhesive covered wood pieces are assembled in a mould.

In certain embodiments, the assembled wood pieces are subjected to pressure of about 4 to 20 Mpa during the compression step.

In certain embodiments, the assembled wood pieces are heated to or maintained at a temperature of from about 70° C. to about 150° C. during the compression step.

In certain embodiments, the compression step takes from about 5 minutes to about 90 minutes.

In certain embodiments in which the assembled wood pieces are heated during the compression step the at least partially-cured manufactured wood product is released from the mould whilst it is still warm.

In certain embodiments, the plurality of natural wood pieces are mechanically deformed during processing so that adjacent wood pieces conform to the shape of one another.

In certain embodiments, a veneer profile of each of the assembled wood pieces after compression is different to the veneer profile of each of the assembled wood pieces prior to compression.

In certain embodiments, the partially cured manufactured wood product is subjected a further curing step to provide the manufactured wood product.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

The present disclosure is a result of the inventors' research into resins suitable for use in the production of manufactured wood products and which provide a new approach to overcoming issues associated with current approaches. In particular, the inventors have found that certain thermoplastic adhesives, when applied to strands or veneers of wood, can be deformed under pressure and subsequently crosslinked beyond a critical crosslinking amount under pressure and, optionally, heat to create a product with properties similar to that of the original wood. Under these conditions, a manufactured wood product can be produced that has a substantially similar or greater density to the original wood and whose integrity can be substantially maintained (i) after release of pressure and/or heating post release and (ii) when boiled for three hours. Thermoplastic adhesives that do not crosslink beyond a critical level (i) do not maintain their compressed form and (ii) do not pass such a boiling test and typically result in an expanded structure which resembles the starting wood pieces as a result of the boiling test.

The use of the adhesives described herein enables the compressing of the timber pieces into a dense monolith that has physical integrity within a time frame that is economical. In other words, the monolith can be compressed and cured into its final shape within a timeframe that is economical, and can ideally be released from compression when still hot (if heated) without losing its structural form. This combination of input material, adhesive, moisture content, and heat and pressure is the reason that this product can be manufactured.

These discoveries provide a new means for the economical processing of wood strands, veneers, particles, strips, chips, fibres or pieces (collectively referred to herein as "wood pieces") into reconsolidated wood products. In particular, a thermoplastic adhesive that crosslinks beyond a critical level during processing allows for:

The consolidation of wood pieces into a block of adhesive coated wood pieces under pressure and, optionally, heat until at least a critical amount of crosslinking is achieved, at which time the pressure can be released and the block allowed to cool or continue to be heated without pressure for an additional period without the block deforming significantly or the wood pieces expanding and returning to their initial state prior to the application of pressure; and The continuous extrusion of a composite of the adhesive with wood pieces into a mould to provide the desired shape, maintained by the thermoplastic adhesive which is subsequently crosslinked beyond a critical level under pressure to maintain the shape after the pressure is removed.

In particular, the inventors have found that the crosslinked thermoplastic resins impart desirable physical properties on the products, such as mechanical stability and high levels of density and hardness. Furthermore, the properties of the resin or the manufacturing process can be adjusted to alter the physical properties of the manufactured wood products, thus allowing some of the final properties to be obtained by adjusting resin and/or processing parameters. Furthermore, the adhesives used can be transparent which means that the grain color in the manufactured wood product is the color of the wood of the starting wood pieces which gives rise to a more authentic or natural looking manufactured wood product.

The present disclosure thus provides a new approach to overcoming the fundamental issues associated with prior art approaches.

Disclosed herein is a process of producing a manufactured wood product comprising:

providing a plurality of wood pieces having substantially an equilibrium moisture content;

contacting the plurality of wood pieces with one or more additives under conditions for the additive(s) to soak into the wood pieces;

applying a thermoplastic adhesive comprising a thermoplastic resin and a crosslinking agent to the wood pieces to form adhesive coated wood pieces;

optionally heating the adhesive coated wood pieces to form heated adhesive coated wood pieces;

assembling the adhesive coated wood pieces in a desirable configuration to form assembled adhesive coated wood pieces;

compressing the assembled adhesive coated wood pieces in a press at a pressure and for a time sufficient to compact and compress the assembled wood pieces to force trapped air out of and mechanically deform the assembled adhesive coated wood pieces so that adjacent wood pieces conform to the shape of one another;

crosslinking the thermoplastic adhesive to at least a critical crosslinking amount during the compression step to form an at least partially cured manufactured wood product, wherein the critical crosslinking amount is sufficient such that the at least partially cured manufactured wood product substantially maintains its compressed form and prevents the wood pieces expanding and returning to their initial state upon release of pressure in the compression step;

removing the at least partially cured manufactured wood product from the press; and optionally, further curing the partially cured manufactured wood product to provide the manufactured wood product having substantially an equilibrium moisture content.

The disclosed process provides an alternative to known processes. Typically, known manufactured wood products, such as chipboard, MDF, and the like use thermosetting adhesives which rely on the crosslinking reaction of liquid reactants. In these products, liquid monomers are added to wood or bamboo strands and compressed and heated under conditions to polymerise the monomer and convert the liquid monomer to a solid thermoset adhesive. To achieve this, a large number of chemical reactions must take place which require high temperature, long periods of time and avoidance of side-reactions to achieve a predictable or desirable final product. In contrast, the process described herein uses a thermoplastic adhesive, which is already a polymer, which is then crosslinked to form a three dimensional network during the process. This process requires less chemical reactions, and therefore provides a more robust processing window. It also has the advantage of enabling a water based emulsion polymer system to be used, which is easy to handle, has long pot life, low toxicity, and VOC and can adhere the wood pieces prior to crosslinking. The further crosslinking during the process gives the adhesive more compression set, enabling the manufactured wood product to be released from the mould hot, and also gives the manufactured wood product greater thermal stability during further processing and use.

The use of a crosslinkable thermoplastic adhesive allows the desired properties to be achieved rapidly by crosslinking the adhesive during the compression step. Thermoplastic adhesives also offer advantages in speed due to the lower conversion necessary to reach the gel point, the crosslink density is relatively low so less crosslinking agent is needed thus protecting the wood, requiring lower energy, providing better reaction control, a wider process window and faster processing times. Furthermore, known formaldehyde type resins react quickly once at temperature, but have complex chemistry and if not heated correctly (for example due to the thickness of the product to be heated) will not cure effectively. Variable moisture content in the wood pieces to be processed can also result in different properties within a block and from block to block. The present process minimises these problems. By using relatively low temperatures during processing, the presence of water in the wood pieces is less of a problem, and this gives the potential for maintaining more water in the wood during the process. In the processes described herein, close to (i.e. "substantially") equilibrium moisture levels are maintained in the wood throughout the process. For example, the equilibrium moisture content of the plurality of natural wood pieces may be from about 5% to about 15% (w/w) for pine or from about 8% to about 10% for hardwood species. Thus, the equilibrium moisture content of the plurality of natural wood pieces may be 5%, 6%, 7%, 8%, 9%, 10%, 11%, 12%, 13%, 14% or 15% (w/w). Prior art processes require the manufactured wood products to be dried or otherwise stabilised at the equilibrium moisture content after manufacture otherwise the product cups, warps or twists when cut. This tends to be an energy or time intensive step. However, in the processes described herein, the moisture content of the wood pieces is generally maintained throughout the process so there is less waiting time at the end of the process before the product can be cut, etc. Thus, matching the moisture content of the wood to the final application environment reduces twisting and warping and reduces the need for aging to stabilise the manufactured product before further processing. Also lower drying requirements make it cheaper to run because less energy is used.

As used herein, the term about when used in reference to a value means that the actual value may be within ±20%, ±19%, ±18%, ±17%, ±16%, ±15%, ±14%, ±13%, ±12%, ±11%, ±10%, ±9%, ±8%, ±7%, ±6%, ±5%, ±4%, ±3%, ±2% or ±1%.

As used herein, the term "manufactured wood product" is intended to mean a man-made or machine-made wood item, such as, for example, engineered wood boards, wood-containing composite boards, fibreboards, oriented strand boards, or any other similar pieces that contains wood matter. The materials and processes described herein are particularly suitable for use as floor boards for domestic or commercial buildings and further discussion herein may refer to floor boards and methods for their manufacture. However, it will be appreciated that any such discussion is not to be taken as limiting the scope of the present disclosure to that particular use and a number of alternative uses for the manufactured wood products are also contemplated, such as in furniture, wall panel, structural components, railroad sleepers, decking, posts and railings or any use where the physical and/or aesthetic properties of the wood product are important. In certain embodiments, the manufactured wood product is suitable for outer surface use and has desirable physical properties and aesthetic appearance suited to the end use.

In certain embodiments, the manufactured wood product comprises a plurality of wood pieces that have been compressed and adhesively bonded together by a crosslinked thermoplastic adhesive. In these embodiments, the manufactured wood product is an essentially monolithic structure.

The plurality of wood pieces are mechanically deformed during processing so that adjacent wood pieces conform to the shape of one another. Furthermore, a veneer profile of each of the assembled wood pieces after compression is different to the veneer profile of each of the assembled wood pieces prior to compression. The veneer profile can be determined by examining the "end grain" of a block of the manufactured wood product. Thus, provided herein is a manufactured wood product in the form of a consolidated monolith comprising a plurality of natural wood pieces adhesively bonded together by a crosslinked thermoplastic adhesive which has been cross linked during processing wherein a veneer profile of each of the assembled wood pieces after compression is different to the veneer profile of each of the assembled wood pieces prior to compression. As used herein, the term "wood pieces" includes wood strands, veneers, particles, strips, chips, fibres or pieces. The inventors have discovered that the wood pieces must be less than a critical thickness because thick wood pieces processed with the same adhesives in a thick laminate configuration do not pass tests such as a boil test. Without being limited by theory, we suggest that if the wood pieces are too thick their own mechanical properties can overwhelm adhesion between the wood and the adhesive and/or the cohesive strength of the adhesive and cause the structure to delaminate when the wood pieces are allowed to expand, such as during exposure to moisture/humidity.

The wood pieces may have a thickness that is a minimum of about 0.1 mm, about 0.3 mm, about 0.5 mm, about 1 mm, about 2 mm or about 3 mm and is a maximum of about 10 mm, about 8 mm, about 6 mm, about 5 mm, about 4 mm, about 3 mm or about 2 mm. The wood pieces may have any suitable dimensions in plan view. In certain embodiments, p, and the transverse direction is any dimension that is convenient for manufacturability, further processing into boards or for a specific application. In other words, the manufactured wood product may be a strand woven product in which the fiber/strand length is the product length, and the transverse direction can be a continuous sheet that is assembled into the mould in a variety of ways, or it can be a cut sheet, or it can be cut or crushed strands.

The wood for the wood pieces is not particularly limited and it can, for example, be any hardwood, softwood or "grass", such as bamboo or palms. Therefore, as used herein, the term "natural wood pieces" is intended to include within its scope grasses such as bamboo and palm that are known for use in the production of manufactured wood products. Suitable woods include, but are not limited to eucalypt, pine, red maple, white maple, Queensland maple, ash, aspen, walnut, oak, redwood, birchwood, mahogany, ebony, cherry wood, oregon, poplar, etc. Grasses such as bamboo and palms can also be used. In certain specific embodiments, the wood is a pine, such as radiata pine, bunya pine, Caribbean pine (Southern pine), Corsican pine, Cypress macrocarpa (Monterey pine), hoop pine, kauri pine, loblolly pine (Southern pine), maritime pine, ponderosa pine, and slash pine (Southern pine). In other certain specific embodiments, the wood is a eucalypt, such as red gum, blue gum, blackbutt, blue leaved stringybark, brown mallet, Dunns white gum, flooded gum, Gympie messmate, jarrah, karri, messmate, river red gum, silver topped stringybark, spotted gum, and tallowwood. In certain embodiments, the wood is selected from the group consisting of pine, red maple, red oak, ash, aspen or blue gum. The final manufactured wood product may include more than one species or type of wood.

Advantageously, the wood pieces can be derived from low value woods such as saw mill waste, rotary mill waste, plantation waste including first thinnings, etc. However, it will also be appreciated that the wood pieces could also be sourced from high value timber, if desired.

The wood that is used to form the wood pieces may vary significantly in size and quality. If necessary, the wood may be broken up to form wood pieces of a desirable size using any suitable apparatus. In certain embodiments, the wood pieces are formed by rolling up a continuous veneer sheet and then crushing it. In other examples, the wood pieces may be cut strips, multiple smaller rolls of veneer or crushed strands.

Advantageously, the wood pieces have a natural wood appearance and the manufactured wood product is suitable for use in applications where the grain of the wood product is displayed and is aesthetically pleasing.

As discussed previously, by using a crosslinked thermoplastic adhesive the moisture content of the wood pieces does not need to be controlled accurately or to a very low level, and a range of values can be used, enabling a wider process window than would be possible with moisture sensitive adhesives such as isocyanate based materials, for example. Depending on the wood species used, the moisture content of the wood pieces may be from about 5% to about 20%. For example, hardwoods may have a starting moisture content of 6-7%. Pine wood pieces may have a starting moisture content of 10-12%. Typically, the starting wood pieces have a set moisture content (eg 12%). The optimum moisture content for the wood pieces may be a function of the desired moisture content in the final product, the wood species used and/or the adhesive used and can be determined empirically. If the moisture content of the wood pieces is too low the wood pieces may absorb too much moisture from the adhesive and compromise the physical properties of the product. Conversely, if the moisture content of the wood pieces is too high the adhesive may not be as effective. Optionally, the starting wood pieces can be dried to a desired moisture content prior to application of the adhesive. The drying may be carried out by air drying or by heating using a suitable heating apparatus, such as an infrared heater or an oven supplied with hot air, for example. The inventors have discovered that the process using crosslinked thermoplastic adhesives allows higher moisture contents than possible for other adhesives and this can advantageously facilitate the deformation of the wood pieces during the consolidation phase to produce a superior manufactured wood monolith.

The thermoplastic adhesive can be applied to the wood pieces by hand, brush, spray, roller, dipping, machine, and/or curtain coater. Known spray coating, dip coating, and spin coating methods can be used. In certain embodiments, the thermoplastic adhesive is spray coated onto the wood pieces. The thermoplastic adhesive can be delivered as an aqueous emulsion, in a solvent or by extrusion of a hot melt. The thermoplastic resin and crosslinking agent can be applied to the wood pieces together (i.e. simultaneously) or separately.

The adhesive is a thermoplastic resin that can be crosslinked. As used herein the term "thermoplastic" is intended to mean a polymer that becomes pliable or mouldable or flowable above its glass transition temperature ($T_g$) and solid below its $T_g$.

Thus, also provided herein is a manufactured wood product in the form of a consolidated monolith comprising a plurality of natural wood pieces adhesively bonded together by a crosslinked thermoplastic adhesive which has been cross linked during processing wherein the manufactured wood product retains its consolidated shape at elevated temperatures and wherein the crosslinked thermoplastic adhesive has a glass transition temperature at or lower than the normal use temperature of the manufactured wood product.

A wide range of thermoplastic resins are known and it is contemplated that any one or more known thermoplastic resins could be used provided the adhesive can be crosslinked during processing and the $T_g$ of the adhesive in the manufactured wood products is at or less than the normal use temperature of the manufactured wood product, such as lower than room temperature. The physical properties of the adhesive may be preselected to have a Tg lower than 70 degrees Celsius, 50 degrees Celsius, 40 degrees Celsius, 30 degrees Celsius or 20 degrees Celsius. In certain embodiments, the adhesive has a Tg of from −30 degrees Celsius to about 25 degrees Celsius, making the adhesive "rubbery" at room temperature. An advantage of the adhesive being rubbery at room temperature is it enables post curing (i.e. curing after the product has been removed from the press and cooled) to occur at lower temperature. In contrast, adhesives with a higher Tg are glassy at room temperature and may require a thermal post curing step, thereby increasing costs and complexity of the process. Adhesives that are rubbery also tend to accept additives such as stains more easily than adhesives that are glassy at room temperature. Surprisingly, the present inventors have found that thermoplastics that have a Tg below the normal use temperature of the wood product (and are therefore rubbery), are very effective and provide distinct advantages in the final product, which is opposite to the normally held view that the adhesive should be glassy at the normal operating temperatures, which is the case for products such as medium-density fibreboard (MDF), high-density fibreboard HDF, plywood, laminated veneer lumber (LVL), particle board, etc.

In certain embodiments, the thermoplastic resin is a polyvinyl ester. Polyvinyl esters are formed from vinyl acetate and its copolymers. For example, the inventors have found that polyvinyl acetate ("PVA") is suitable. As used herein, the terms "polyvinyl acetate" and "PVA" are intended to include within their scope hydrolysed forms of PVA including forms with various levels of hydrolysis to form poly(vinyl alcohol) copolymers. Other vinyl acetate based polymers that could be used include poly(vinyl acetate-co-butyl maleate-co-isobornyl acrylate, poly(vinyl acetate) cyanomethyl diphenylcarbamodithioate, poly(vinyl cinnamate), poly(ethylenevinylacetate) and poly(vinyl stearate) and their copolymers or terpolymers, including polymers made from acrylates and methacrylates.

The commercially available adhesives Titebond® III (Franklin International, Columbus, Ohio, USA) and similar adhesives from Sika, Selleys and Bostik are suitable thermoplastic adhesives.

As discussed, the thermoplastic resin is cross linked during processing, which includes during the consolidation phase as well as post consolidation. Specifically, the thermoplastic resin material, such as PVA, is cross linked using a suitable reactive cross linking agent. The present inventors found that manufactured wood products formed using a thermoplastic adhesive that is not cross linked display inferior physical properties relative to those that are formed using a thermoplastic adhesive combined with a cross-linking agent. For example, manufactured wood products formed from wood pieces below a critical thickness and using a PVA adhesive and no cross-linking agent did not survive a three hour boil test, whereas those formed using PVA and a cross-linking agent performed well in the same test. A PVA adhesive with a cross-linking agent that was not cured or crosslinked sufficiently, also did not survive a three hour boil test. Thus, cross linking of the thermoplastic above a critical level confers desirable physical properties on the manufactured wood product.

In certain embodiments, the cross-linking agent is a catalyst or a reactive agent selected from N-methylolacrylamide, aluminum zirconium carbonates, aluminum chloride, borax, magnesium chloride, p-toluene sulfonic acid, acetaldehyde, formaldehyde, urea-formaldehyde, melamine-formaldehyde, trimethylolmelamine, cupric ammonium complexes, chromium complexes, organic titanates, dichromates, polyaldehyde, butyraldehyde, chloroformate esters, urea, isocyanates, and ammonium zirconium carbonates. The thermoplastic adhesive can also be cross-linked by ethoxylation, propoxylation, cyanoethylation, exposure to gamma radiation or e-beam crosslinking. If required, the thermoplastic resin may be manufactured to react with a specific cross-linking agent. As used herein, the term "cross linking" is used broadly to include covalent cross links as well as ionic cross links (ie. complexation).

In certain specific embodiments, the cross-linking agent is aluminum chloride. In other specific embodiments, the cross-linking agent is p-toluene sulfonic acid.

Other cross-linking agents that can be used are dialdehydes. The dialdehyde may have the general formula OHC—R—CHO wherein R is a bond or a divalent organic radical such as an aliphatic, cycloaliphatic, aromatic or heterocyclic radical. In certain embodiments, R is a divalent aliphatic hydrocarbon radical having from 1 to 12 carbon atoms. Glyoxal (R=bond), malondialdehyde (R=CH2), succindialdehyde (R=$CH_2CH_2$) and glutaraldehyde (ie. R=$CH_2CH_2CH_2$) are suitable dialdehydes. In certain embodiments, the cross-linking agent is glyoxal. In other certain embodiments, the cross-linking agent is glutaraldehyde.

The crosslinking agent may be used in an amount of 0.1 to 20% by weight.

As discussed previously, the thermoplastic adhesive is crosslinked beyond a critical crosslinking amount. A "critical crosslinking amount" is achieved when a product retains its consolidated shape at elevated temperatures. In other words, and without being limited by theory, the wood pieces in the manufactured wood product tend to expand to their initial shape but the crosslinking provides sufficient mechanical reinforcement to the adhesive that it is able to withstand the internal stress generated by the wood pieces.

The thermoplastic adhesive can be crosslinked (or "cured") at any suitable stage during the formation of the manufactured wood product. Suitably, at least some of the crosslinking occurs when the wood pieces are compressed in the compression step during formation of the manufactured wood product. As described in more detail later, adhesive covered wood pieces are typically compressed in a mould under conditions to at least partially cure the thermoplastic adhesive and form a partially-cured manufactured wood product which can then be further cured to provide the manufactured wood product. Whilst the crosslinking agent could be added at any stage of the manufacturing process, it may be beneficial to contact the wood material wood pieces with the thermoplastic adhesive and the crosslinking agent before they are assembled in the mould to ensure the amount of crosslinking is relatively uniformly distributed throughout the final product.

The physical properties of the adhesive may be preselected to have a Tg lower than room temperature, making them "rubbery" at normal service temperatures of the product.

Additives may be included in the crosslinked thermoplastic adhesive to confer favorable properties on the manufactured wood product. Suitable additives include, but are not limited to swell control agents, fungicides, insecticides, coloring agents, UV stabilizers, fillers, extenders, fire resistant agents, fire retardants, fibres, and the like. The additives may be added to the thermoplastic adhesive before it is applied to the wood pieces. This leads to a simple manufacturing process for introducing additives into the manufactured wood product. The additives can be optionally designed to migrate from the adhesive into the wood pieces during processing.

The additives may also be added directly to the wood pieces before coating with the adhesive to allow them to soak into the wood pieces thereby providing protection throughout the entire veneer and ultimately throughout the final product. This may have the benefit of being able to use lower levels of some of the agents than is possible in wood products today.

The additives may also be applied after the wood pieces are coated with adhesive, thereby including the additives in the adhesive, but without impacting the stability, pot-life or properties such as viscosity, of the adhesive prior to coating the wood pieces.

Suitable additives include lignin and tannic acid. In practice, the inventors have found that addition of lignin and/or tannic acid as additives in conjunction with dialdehyde crosslinking agents results in the production of a manufactured wood product that shows reduced swelling (relative to a product to which no lignin and/or tannin has been added) and is more resistant to outdoor weathering.

Suitable fungicides include any chemical that will kill, destroy, inhibit, or inactivate a fungus to prevent growth. The fungicide can be synthetic or biosynthetic and can include both organic and inorganic compounds. The fungicide can be a solid (e.g. powder), liquid, or a combination thereof. See, e.g., Concise Chemical and Technical Dictionary, Fourth Enlarged edition, Bennett, Chemical Publishing Company, NY, N.Y. (1986); and McGraw-Hill Concise Encyclopaedia of Science & Technology, Fourth Edition, Parker, McGraw-Hill, NY, N.Y., (1998). Examples of suitable fungicides include formic acid, acetic acid, propionic acid, pelargonic acid, capric acid, copper ammonium acetate (CAA), copper naphthenate, and combinations thereof.

The pesticide can be any chemical, but is preferably one that has been approved by the relevant controlling government agency. Examples of suitable pesticides include copper containing pesticides, such as copper ammonium carbonate. In certain embodiments, the pesticide is useful for the mitigation, control, or elimination of termites.

Suitable UV stabilisers include the range of benzophenones, triazoles, salicylates, formanidines, and benzoates which are known UV stabilisers. The following materials are suitable: Sanduvor VSU: 2-ethyl-2-ethoxyanilide (Trademark of Sandoz Corp.), Tinuvin 144 and 770: hindered amine light stabilisers (Trademark of Ciba Geigy for HALS), Irgastab 2002: a nickel phosphate (Trademark of Ciba-Geigy), 2,2'-dihydroxybenzphenone, 2,2,4,4'-tetrahydroxybenzophenone, 2,2'-dihydroxy-4,4'-dimethoxybenzophenone, 2,2'-dihydroxy-4,4'-diethoxybenzophenone, 2,2'-dihydroxy-4,4'-dipropoxybenzophenone, 2,2'-dihydroxy-4,4'-dibutoxybenzophenone, 2,2'-dihydroxy-4-methoxy-4'-ethoxybenzophenone, 2,2'-dihydroxy-4-methoxy-4'-propoxybenzophenone, 2-hydroxy-4,4',5'-trimethoxybenzophenone, 2-hydroxy-4-ethoxy-4'-methylbenzophenone, 2-hydroxy-4-ethoxy-4'-ethylbenzophenone, 2-hydroxy-4-ethoxy-4'-propylbenzophenone, 2-hydroxy-4-ethoxy-4'-methoxybenzophenone, 2-hydroxy-4,4-diethoxybenzophenone, 2-hydroxy-4-ethoxy-4'-propoxybenzophenone, 2-hydroxy-4-ethoxy-4'-butoxybenzophenone, 2-hydroxy-4-ethoxy-4'-chlorobenzophenone, 2-hydroxy-4-ethoxy-4;-bromobenzophenone, 2-(2'-hydroxy-5'-methylphenyl)benzotriazole, 2-(2'-hydroxy-5'-t-butylphenyl)benzotriazole, 2-(2'-hydroxy-3'-methyl-5-t'-butylphenyl)benzotriazole, 2-(2'-hydroxy-5'-cyclohexylphenyl)benzotriazole, 2-(2'-hydroxy-3',5'-dimethylphenyl)benzotriazole, 2-(2'-hydroxy-5'-t-butylphenyl)-5-chlorobenzotriazole and, 2-(2'-hydroxy-3'-di-t-butylphenyl)benzotriazole, 2,2'-dihydroxy-4-methoxy-4'-butoxybenzophenone, 2,2'-dihydroxy-4-ethoxy-4'-propoxybenzophenone, 2,3'-dihydroxy-4,4'-dimethoxybenzophenone, 2,3'-dihydroxy-4-methoxy-4'-butoxybenzophenone, 2,3'-dihydroxy-4,4,5'-trimethoxybenzophenone, 2-hydroxy-4,4,5'-trimethoxybenzophenone, 2-hydroxy-4,4,6,'-tributoxybenzophenone, 2-hydroxy-4-ethoxy-2,4'-dibutylbenzophenone, 2-hydroxy-4-propoxy-4,6'-dichlorobenzophenone, 2-hydroxy-4-propoxy-4',6'-dibromobenzophenone, 2,4-dihydroxybenzophenone, 2-hydroxy-4-methoxybenzophenone, 2-hydroxy-4-ethoxybenzophenone, 2-hydroxy-4-propoxybenzophenone, 2-hydroxy-4-butoxybenzophenone, 2-hydroxy-4-methoxy-4'-methylbenzophenone, 2-hydroxy-4-methoxy-4'-propylbenzophenone, 2-hydroxy-4-methoxy-4'-butylbenzophenone, 2-hydroxy-4-methoxy-4'-t-butylbenzophenone, 2-hydroxy-4-methoxy-4'-chlorobenzophenone, 2-hydroxy-4-methoxy-2'-chlorobenzophenone, 2-hydroxy-4-methoxy-4'-bromobenzophenone, 2-hydroxy-4,4'-dimethoxybenzophenone, 2-hydroxy-4,4'-dimethoxy-3-methylbenzophenone, 2-hydroxy-4,4'-dimethoxy-3-methylbenzophenone, 2-hydroxy-4,4'-2'-ethylbenzophenone, and 2-hydroxy-acetophenone.

Nanoparticles such as ZnO may also be used as UV absorbers and protecting agents in the adhesive. Without being bound by theory, these nanoparticles offer the advantages of being able to absorb potentially damaging UV light but remaining transparent to the visible region of the spectrum, thereby not impacting the color or appearance of the wood product. Other nanoparticles include, but are not limited to $TiO_2$.

Suitable fillers include substances added to the adhesive to improve its working properties, strength, or other qualities. For example, the filler may be fibres to improve the compressive and/or bonding strength of the adhesive and, hence, the final manufactured wood product. The fibres may be glass fibres, carbon fibres, cellulose fibres, cellulose nanotubes, carbon microfibers, carbon nanofibers, carbon microtubules, carbon nanotubes, and the like.

Intumescent ceramic particles may be added to the adhesive in order to confer fire retardant properties on the manufactured wood product. Hydrated metal silicates, borax, calcium borate, magnesium borate, and zinc borate are suitable materials for this purpose.

Metal hydrates which release water on heating, halogenated retardants, char forming additives, and low melting glasses may be added to the adhesive in order to confer fire resistant properties on the manufactured wood product.

The adhesive coated wood pieces are then returned to approximately their equilibrium moisture content. If necessary, the adhesive coated wood pieces can be dried using any suitable method, including air drying or by heating. Heating can be provided by hot air, microwave, radio frequency or infrared methods, which impact the time required to heat and then remove moisture or solvents to the desired level.

The adhesive coated wood pieces may be heated prior to assembling them in a desirable configuration or, alternatively, no heating may be required to initiate crosslinking of the thermoplastic adhesive during the compression step. In certain embodiments, the adhesive coated wood pieces are heated to the temperature required for moulding before being arranged in the mould, thereby eliminating the need for heating during moulding and being limited by thermal conductivity through the manufactured monolith. Advantageously, eliminating the need for additional heating during moulding speeds up the process as the heat assists with conformation of the wood pieces in the mould, in addition to accelerating the curing process and this has the added advantage of decreasing the process time in the press because the low thermal conductivity of the wood is not limiting the heating of the whole block. The temperature to which the adhesive coated wood pieces are heated is ideally low enough to prevent or minimise crosslinking of the adhesive before compression. In certain embodiments, the adhesive coated wood pieces are heated to a temperature of from about 50° C. to about 200° C., such as from about 50° C. to about 100° C. In certain specific embodiments, the adhesive coated wood pieces are heated to a temperature of about 75° C. This step results in the adhesive at least partially drying and heats individual adhesive coated wood pieces. By heating the adhesive coated wood pieces prior to assembling them in the mould, the heat required in the compression step is not solely provided via the mould. In this way, the thickness of the assembled wood pieces in the mould is not as important as is the case when the sole source of heat is provided by external heat sources during the compression stage. This means that the compression stage may be carried out more rapidly and less time is required to heat the innermost wood pieces in the mould to the desired temperature.

The adhesive coated wood pieces may be heated for a period of from about 1 minute to about 40 minutes, such as 5 minutes, 6 minutes, 7 minutes, 8 minutes, 9 minutes, 10 minutes, 11 minutes, 12 minutes, 13 minutes, 14 minutes, 15 minutes, 16 minutes, 17 minutes, 18 minutes, 19 minutes, 20 minutes, 21 minutes, 22 minutes, 23 minutes, 24 minutes, 25 minutes, 26 minutes, 27 minutes, 28 minutes, 29 minutes, 30 minutes, 31 minutes, 32 minutes, 33 minutes, 34 minutes, 35 minutes, 36 minutes, 37 minutes, 38 minutes, 39 minutes or 40 minutes. In certain embodiments, the adhesive coated wood pieces may be heated for a period of from about 10 minutes to about 12 minutes.

The adhesive covered wood pieces are then assembled prior to compression. The adhesive covered wood pieces can be assembled in a mould, onto the platen of a press or on a plastic release sheet. In certain embodiments, the wood pieces are assembled in a mould or press. The wood pieces are generally aligned within the mould or press. The mould can be any suitable shape, such as square or rectangular, flat or slightly curved to provide a pre-shaped monolith. A benefit of the processes described herein is that the mould can be shaped (e.g. curved) to provide shaped manufactured wood products. For example, thin manufactured wood products may be used for decorative purposes on furniture or in motor vehicles and the mould can be shaped appropriately and can include surface features (e.g. indents, detents, etc.) that may be transferred to the manufactured wood product.

The height of the assembled wood pieces may be less than, greater than, or substantially the same as the height of the mould or press. Generally, the pressing step will compact and compress the assembled wood pieces together so that the resulting material will have a smaller cross-section than the unpressed assembled wood pieces.

Figure 1:
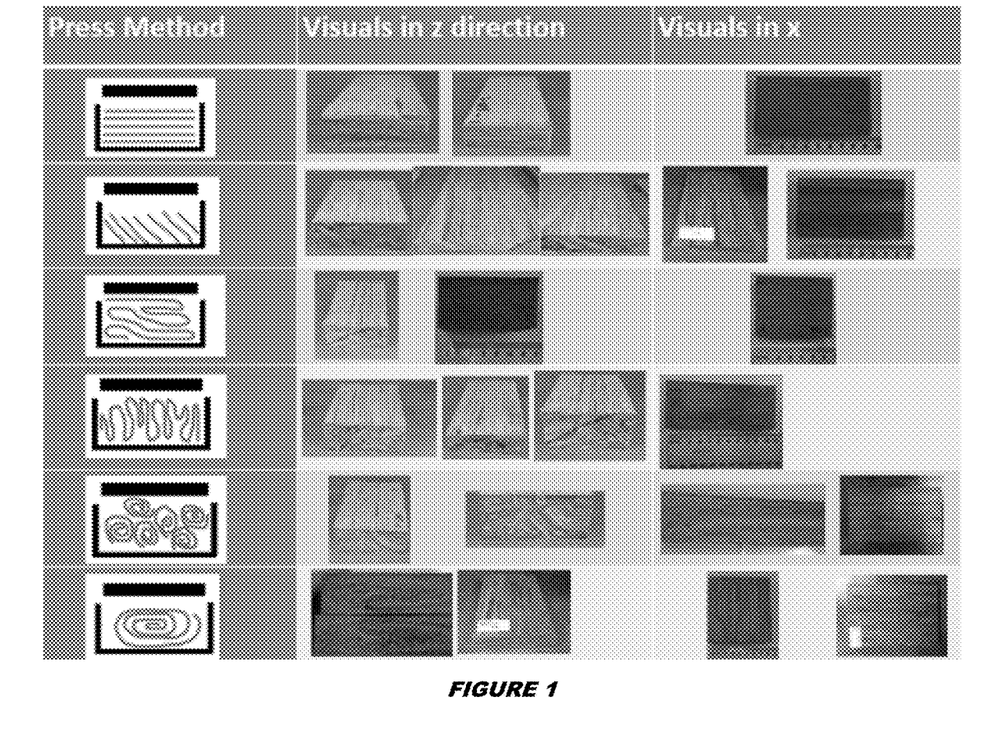
FIG. 1 shows the visual results obtained using different orientations of wood pieces in a mould.

The wood pieces are generally aligned within the mould or press. In certain embodiments, the mould or press has a length and a majority of the wood pieces are assembled with the fibre direction of the wood pieces substantially aligned with the length of the mould or press. In certain embodiments, the length of the wood pieces in the fibre direction is substantially the same as the length of the mould. The orientation of the wood pieces with respect to the base of the mould can be used to create different visual effects in the final manufactured wood products, as best seen in FIG. 1. For example, wood pieces that are positioned parallel to the base of the mould will give rise to a manufactured wood product having the appearance of the uppermost wood piece. Wood pieces that are positioned generally perpendicular to the base of the mould will give rise to a manufactured wood product having a stripy appearance. Wood pieces that are positioned angled relative to the base of the mould will give rise to a manufactured wood product having a more of a wood grain appearance. It is also possible to use wood pieces of different wood species or different colors to provide desired effects in the manufactured wood product. Advantageously, a wide range of different orientations of wood pieces can be tolerated in the processes described herein without materially affecting the physical properties of the manufactured wood product.

Once the adhesive covered wood pieces are assembled pressure is applied to compress the assembled wood pieces to consolidate them. A suitable press can be used to apply the compression. Any suitable press device and/or means may be employed to apply pressure to the assembled adhesive covered wood pieces. The pressure forces trapped air out of the assembled adhesive covered wood pieces, creates molecular contact between wood surfaces and forces the adhesive to penetrate into the wood structure for more effective mechanical bonding. In other words, the adhesive reacts with itself and with the wood pieces in the compression step. Furthermore, the wood pieces are mechanically deformed in the compression step and, as a result, adjacent wood pieces conform to the shape of one another and, at least to some extent, become interlocked with one another thereby increasing the hardness and durability of the product. The assembled adhesive covered wood pieces may be subjected to pressure of about 0-100 MPa. In certain embodiments, the assembled adhesive covered wood pieces are subjected to pressure of about 4 to 20 MPa, such as about 6-10 MPa.

As discussed earlier, the adhesive coated wood pieces may be heated prior to assembly and there are certain processing advantages that derive from heating them prior to assembly. However, it is also contemplated that the wood pieces may alternatively, or in addition, be heated during the compression step. For example, a heated mould may be used.

The thermoplastic adhesive is crosslinked to form an at least partially cured manufactured wood product. The crosslinking may be initiated by heating during the compression step or it may be initiated at room temperature during the compression step, depending on the thermoplastic resin and the crosslinking agent used. The assembled adhesive covered wood pieces may be maintained at a temperature of from about 70° C. to about 150° C. during this stage. This conductive heat transfer facilitates the effective curing of the adhesive. The compression step may take from about 5 minutes to about 90 minutes. In certain embodiments, the compression step is carried out for about 20 minutes.

The crosslinking and compression steps may provide either a fully cured or a partially cured manufactured wood product. The term "an at least partially cured manufactured wood product" includes within its scope both partially and fully cured products.

If the adhesive coated wood pieces are heated prior to or during the compression step the at least partially-cured manufactured wood product may be cooled prior to being released or it may be released whilst it is still warm. In the latter case, processing advantages may be derived from removing the partially-cured manufactured wood product while it is still warm. Specifically, for products made using phenol formaldehyde resins the products have to be cooled prior to release from the mould because the resins are formed from monomers/pre-polymers and this means there is a relatively long curing time and if they are released hot from the mould the product tends to fall apart. Less energy and time are required if the partially-cured manufactured wood product can be removed from the mould while it is still warm.

In certain embodiments, the partially cured manufactured wood product may be subjected a further curing step to provide the manufactured wood product. The further curing may be carried out for up to 4 hours at temperatures up to 140° C. as required.

After processing, the manufactured wood product is monolithic with substantially no voids or gaps within the product. Depending on the processing conditions and the wood species, the density may be from 0.6 to 1.2 and the corresponding hardness from 0.4 to 3.0 (using a modified Janka hardness test with 5 mm ball; see FIG. 8). The modulus of elasticity (MOE) and modulus of rupture (MOR) of the block or a part cut from the block in which the wood fibres within the veneers are substantially the same length as the test sample is similar to a conventional piece of the same species of wood (see Table 1). Importantly, the manufactured wood products have similar mechanical properties and visual appeal as the timbers that are used to make them, and are very different to prior art manufactured wood products.

TABLE 1

Modulus of elasticity (MOE) and modulus of rupture (MOR)

| Sample | Density (g/cm$^3$) | Hardness (Janka, 5 mm) | MOE (MPa) | MOR (MPa) |
|---|---|---|---|---|
| Particle Board (Chip Board) | 0.54 | 0.67 | 2,500 | 18 |
| Medium Density Fibre Board (MDF) | 0.71 | 0.94 | 2,400 | 27 |
| Plywood | 0.65 | 0.77 | 6350 | 66 |
| Sydney Bluegum (seasoned timber) | 0.85-1.15 | 1.7-2.0 | 18,000 | 140 |
| Sydney Bluegum block | 0.85-1.1 | 1.5-1.9 | 14,500 | 158 |
| Blackbutt (seasoned timber) | 0.9-1.2 | 1.7-2.0 | 19,000 | 144 |
| Blackbutt Block | 0.85-1.2 | 1.6-2.0 | 14,000 | 196 |
| Pine (seasoned timber) | 0.5-0.75 | 0.6-0.8 | 13,000 | 90 |
| Pine block | 0.75-1.2 | 0.7-2.2 | 8,500 | 90 |
| Jarrah seasoned timber | 0.985 | 1.99 | | |

In certain embodiments, the manufactured wood product comprises less than about 15% (w/w) adhesive, such as less than about 10% (w/w) or less than about 6% (w/w).

Also provided herein is a manufactured wood product formed by a process as described herein.

EXAMPLES

Testing—Swelling of Manufactured Wood Blocks in Boiling Water

The boil test is a harsh test that was used to screen the durability of the adhesives. The boil test was performed at 100-105° C. (gentle boil) in tap water for 3 hours. The blocks were then dried at room temperature for 2-3 days before measurements were taken.

Figure 2:
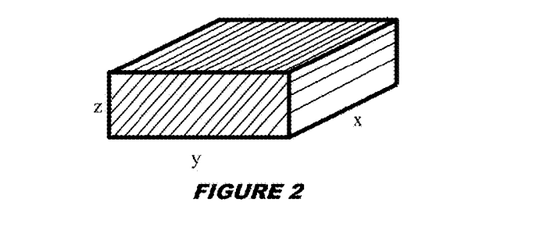
FIG. 2 shows the labelling of dimensions for a block of manufactured wood product.

The results were analysed by taking the initial and final measurements for the x, z, and y dimensions of the block (FIG. 2) and using the following equation to calculate a percentage swell:

$$\text{Swell}(\%) = \frac{x_{final} - x_{initial}}{x_{initial}} \times 100$$

A swell percentage was thus calculated in each direction but due to the directions of the veneers, the swell of the y and z dimensions are the only results which show a significant change.

Testing—Modified Janka Hardness Test

Hardness was measured using the Janka hardness test method (based on ASTMD1037) with a 5 mm ball, averaging 5 measurements taken from the largest face of the block. It is apparent that hardness relates to the density of the blocks.

Testing—Dynamic Mechanical Analysis (DMA)

The thermomechanical properties of the adhesives were tested on thin films of the dried adhesives using a TA Instruments Q800 DM in tension mode at a heating rate of 3 C/min.

Testing—Modulus of Elasticity (MOE) and Modulus of Rupture (MOR)

MOE and MOR were tested using an Instron tensile testing machine in 3-point bending mode with a span of typically 90 mm according to ASTM D1037-06a.

Results of all testing of samples are shown in Table 2, except where otherwise stated.

Example 1—Production of Manufactured Wood Product with Sydney Bluegum and Crosslinking Adhesive Pieces of Sydney Bluegum wood veneer, of thickness between 2 and 3 mm having substantially equilibrium moisture content, were cut into individual pieces that fit into a mould, and had a thermoplastic adhesive emulsion (Franklin Titebond 3 with 10 to 15% (w/w) water added; hereafter "TB3") applied by brushing. The adhesive could also be applied by rolling, spraying or dipping at this point. The pieces were then dried until the adhesive became substantially transparent, and were then loaded into a metal mould and compressed. The adhesive was cured at 80-100° C. under 8-12 T load for approximately 30 minutes. After the moulding time the mould and manufactured wood block were removed from pressure and allowed to cool to ambient temperature. The block did not change shape or deform on removal from the mould.

The block was cut into pieces for testing, one of which was boiled in water for 3 hours. Another piece was tested for hardness using a modified Janka Hardness test using a 5 mm steel indentation ball. The results of testing are shown in Table 2.

Example 2—Attempted Production of Manufactured Wood Product with Non-Crosslinking Adhesive A block of manufactured wood product was produced using the method in Example 1, but with Selleys Aquadhere as the adhesive, which is a non-crosslinking PVA adhesive.

Figure 3:
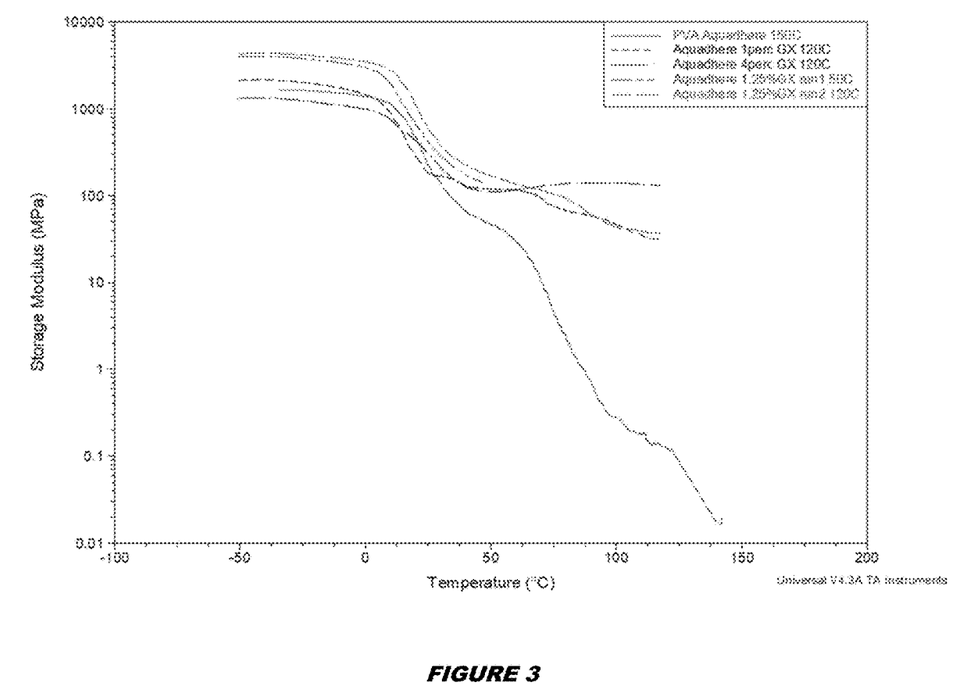
FIG. 3 shows plots of DMA measurements of Storage Modulus for thin films of Aquadhere and Aquadhere plus glyoxal dried overnight. The figure shows that the Aquadhere softens once it passes the glass transition point, indicating that it has no crosslinks, and can easily flow once the temperature is above 50° C., and that adding a crosslinking agent (glyoxal) increases the storage modulus at temperatures above the Tg, therefore indicating that it has cross linked.

This example shows that the use of an adhesive that does not crosslink cannot bond the veneer pieces sufficiently, and causes failure of the block when tested (FIG. 3).

Examples 3 to 5—Attempted Production of Manufactured Wood Product with Low Level Crosslinking Adhesives Blocks of manufactured wood product were produced using the method in Example 1, but with Selleys Aquadhere+ as the adhesive (Example 3), Bostik AVXL+ as the adhesive (Example 4), and Henkel F8 as the adhesive (Example 5), which are all low level crosslinking PVA adhesives.

These examples show that an adhesive displaying a low level of crosslinking does not produce the desired results.

Examples 6 to 8—Production of Manufactured Wood Product with Other Crosslinking Adhesives Blocks of manufactured wood product were produced using the method in Example 1, but with Henkel DLAU7 as the adhesive, which is a crosslinking PVA adhesive (Example 6), Henkel KL325 as the adhesive, which is a crosslinking PVA adhesive (Example 7), and Henkel UK5400, a crosslinking polyurethane emulsion adhesive (Example 8).

These examples show that an adhesive displaying a sufficient level of adhesion and crosslinking does produce a block of manufactured wood product that passes the boil test.

Example 9—Production of Manufactured Wood Product with Additional Crosslinking Additive (Glyoxal)

A block of manufactured wood product was made using the method in Example 1, but with 2.5% glyoxal added to the TB3 adhesive as an additional crosslinking agent. Pressing time was extended to 40 min to ensure any reactions taking place were completed.

Figure 4:
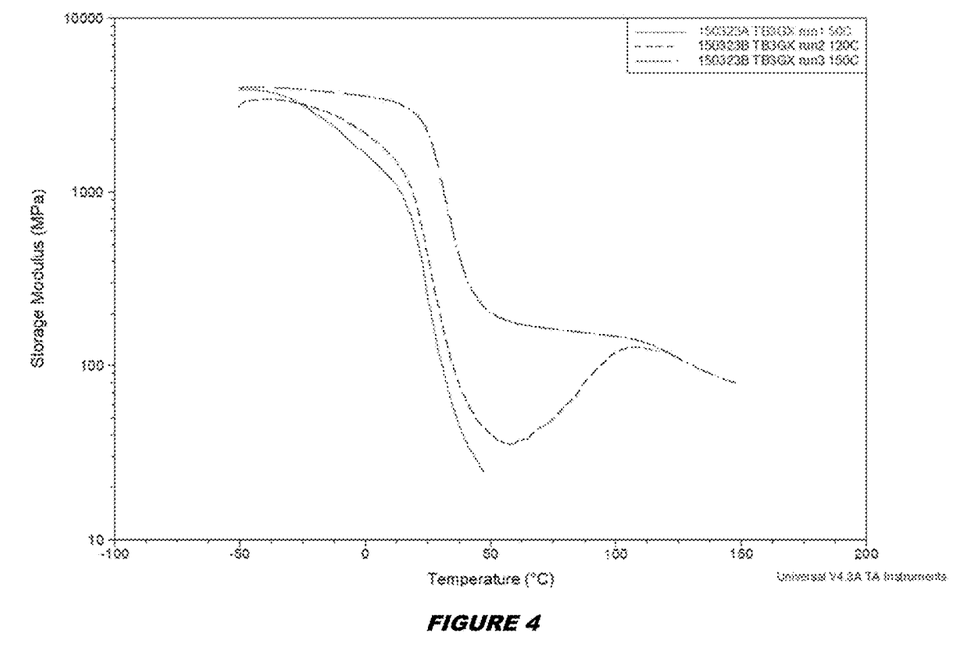
FIG. 4 shows plots of DMA measurements of Storage Modulus for thin films of TB3. The figure shows that TB3 adhesive with glyoxal (TB3GX) crosslinks above 50° C. (storage modulus increases during the second temperature scan) and therefore on a subsequent temperature scan the stiffness is higher at temperatures above the glass transition (20° C.)
Figure 5:
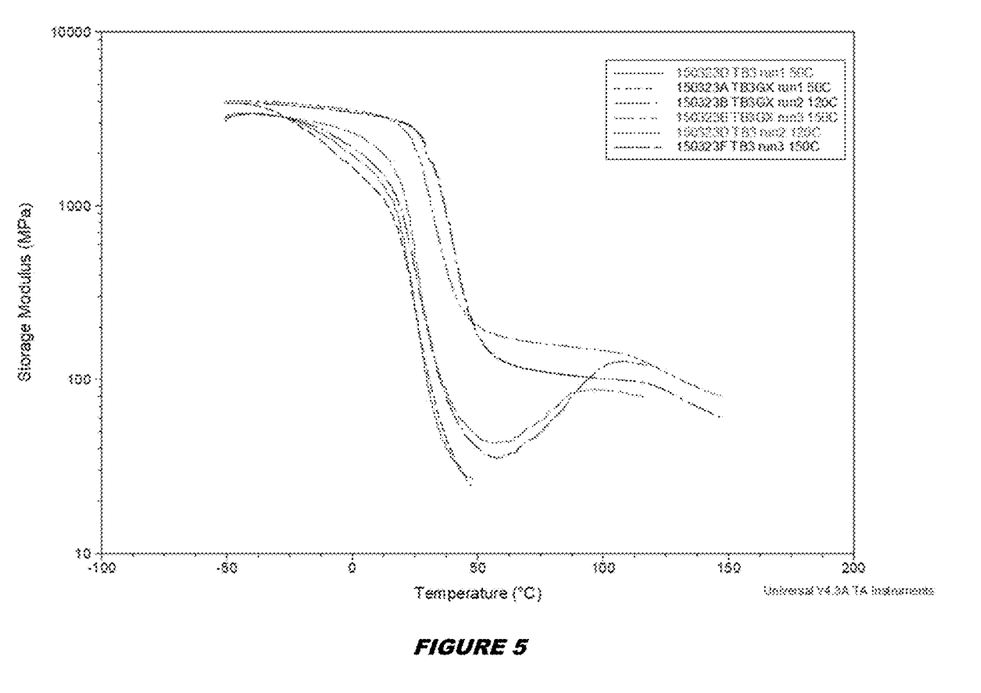
FIG. 5 shows plots of DMA measurements of Storage Modulus for thin films of TB3 in comparison to the plots shown in FIG. 4 (TB3 with glyoxal (TB3GX)). The figure shows that there is greater increase in storage modulus for the TB3GX at temperatures above 50° C. (where the storage modulus increases during the temperature scan) and therefore the amount of crosslinking in the TB3GX is higher.
Figure 6:
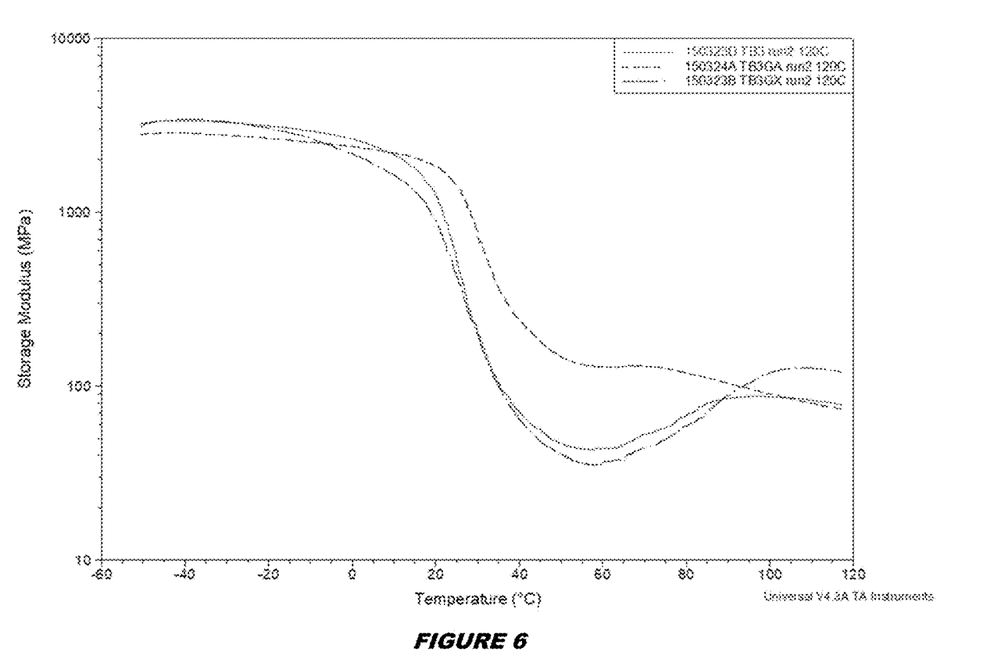
FIG. 6 shows plots of DMA measurements of Storage Modulus for thin films of TB3, TB3 with glutaraldehyde (TB3GA), and TB3 with glyoxal (TB3GX) and is a comparison of FIGS. 4/5. It shows that each of the three different compositions have a curing process that occurs at a different temperature, indicated by the increase in Storage Modulus as temperature increases.

This example shows that the use of a crosslinking additive to a commercial adhesive produced a satisfactory block of manufactured wood product, and the swelling performance (after boiling test) was improved (FIGS. 4-6).

Example 10—Production of Manufactured Wood Product with Additional Crosslinking Additive (Glutaraldehyde)

A block of manufactured wood product was made using the method in Example 1, but with 2.5% glutaraldehyde added to the TB3 adhesive as an additional crosslinking agent. Pressing time was extended to 40 min to ensure any reactions taking place were completed.

This example shows that the use of a crosslinking additive to a commercial adhesive produced a satisfactory block of manufactured wood product, and the swelling performance (after boiling test) was improved (FIG. 6).

Example 11—Production of Manufactured Wood Product Using Alternative Wood Species (Pine)

A block of manufactured wood product was made using the method in Example 1, but with Radiata Pine veneer.

This example shows that alternative species of wood (in this case a softwood) can be used to produce a satisfactory manufactured wood product.

Example 12—Production of Manufactured Wood Product Using Alternative Wood Species (Pine) with a Non-Crosslinking Adhesive A block of manufactured wood product was made using the method in Example 2, but with Radiata Pine veneer.

This example shows that the use of an adhesive that does not crosslink cannot bond the veneer pieces sufficiently, and causes failure of the block when tested.

Example 13—Production of Manufactured Wood Product Using Alternative Wood Species (Pine) with a Crosslinking Adhesive A block of manufactured wood product was made using the method in Example 7, but with Radiata Pine veneer.

This example shows that alternative species of wood (in this case a softwood) can be used to produce a satisfactory block of manufactured wood product, when using an adhesive based on crosslinking PVA.

Example 14—Production of Manufactured Wood Product Using Alternative Wood Species (Bluegum) with a Crosslinking Additive A block of manufactured wood product was made using the method in Example 11, but using adhesive Henkel KL442. The pieces in the block did not adhere and the block fell apart on removal from the mould.

This example shows that not all adhesives can be used to form a monolith which retains its consolidated shape.

Example 15—Production of Manufactured Wood Product Using Alternative Wood Species (Pine) with a Crosslinking Additive A block of manufactured wood product was made using the method in Example 11, but with 5 wt % glyoxal added to the adhesive and a 20 minute press time.

This example shows that the use of a crosslinking additive (glyoxal) to a commercial 1-pack adhesive produced a satisfactory block of manufactured wood product, and the swelling performance (after boiling test) was improved.

Example 16—Production of Manufactured Wood Product Using Alternative Wood Species (Pine) with a Crosslinking Additive and Longer Press Time A block of manufactured wood product was made using the method in Example 15, but using a longer (40 minute) cure time in the press.

This example shows that the use of a crosslinking additive (glyoxal) to a commercial 1-pack adhesive produced a satisfactory block of manufactured wood product, and the swelling performance (after boiling test) was improved.

Example 17—Production of Manufactured Wood Product Using Alternative Wood Species (Pine) with a Crosslinking Additive, Longer Press Time and Post-Heat Treatment A block of manufactured wood product was made using the method in Example 16, but post-heated at 120° C. for 2 hours in an oven.

This example shows that the block of manufactured wood product produced using this method is stable at elevated temperature.

Example 18—Production of Manufactured Wood Product Using Alternative Wood Species (Bamboo)

A block of manufactured wood product was made using the process in Example 1, but using strand of bamboo instead of wood veneer.

Examples 19-23—Production of Manufactured Wood Product Using Alternative Wood Species A block of manufactured wood product was made using the process in Example 5, but using strands of Blackbutt (Example 19), Red Maple (Example 20), Tasmanian Oak (Example 21), *Eucalyptus grandis* (Example 22) and Aspen (Example 23) wood veneers.

Examples 18 to 23 show that this process can utilise various wood species to create a block of manufactured wood product that holds it shape after moulding and after a 3 hour water boil test. These blocks have mechanical properties similar to typical hardwoods.

Example 24—Attempted Production of Manufactured Wood Product with the Veneer Too Thick A block of manufactured wood product was made using the method in Example 1, but with thick pieces of Blackbutt cut from a plank, of approximately 10 mm thickness. The resulting block of manufactured wood product was of poor quality and had many gaps, therefore it did not form a monolithic structure.

Example 25—Production of Manufactured Wood Product with No Heating During the Press Stage A block of manufactured wood product was made using the method in Example 1, but with the press unheated.

This shows that a block of manufactured wood product can be made by curing a wood block containing a room-temperature curing adhesive at ambient temperature.

Examples 26 and 27—Production of Manufactured Wood Product with Cold Release from Press A block of manufactured wood product was made according to the method in Example 1, using Bluegum veneer (Example 26) or *Eucalyptus grandis* (Example 27). In these examples the block was cooled in the mould to <40° C. by using the water cooling system in the hot press.

Figure 8:
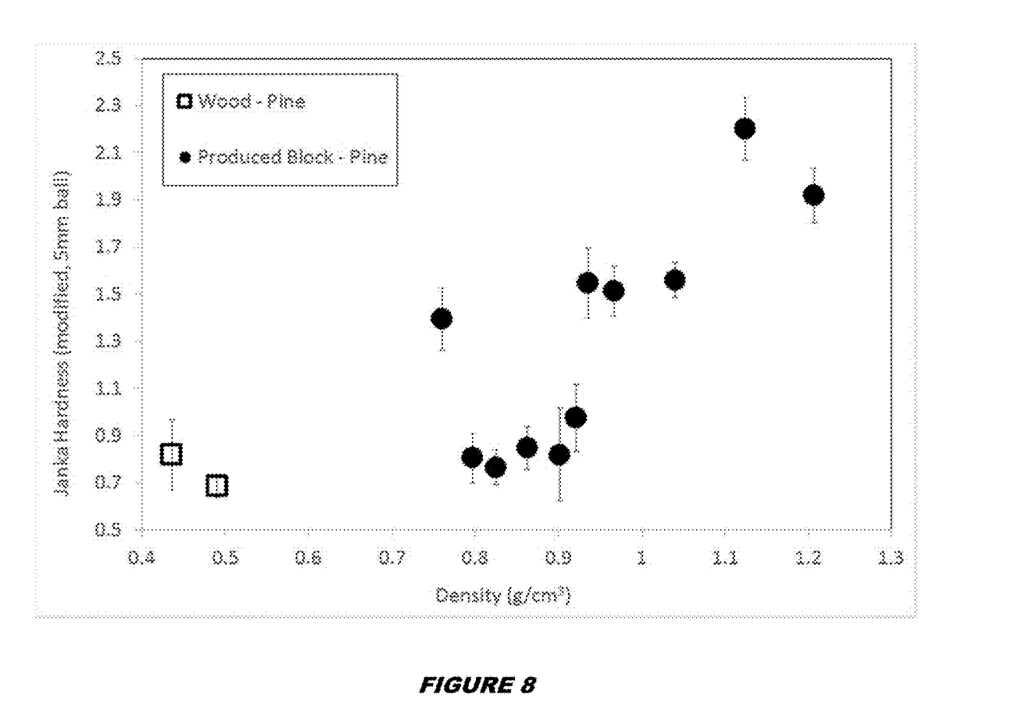
FIG. 8 shows a plots of density and hardness of pine blocks made using various processing conditions, illustrating the range of physical properties that can be achieved.

These examples show that higher density and hardness can be achieved by changing the process conditions. In addition, an illustration of the range of density and hardness properties that can be achieved by altering the process conditions is shown in FIG. 8 for blocks made from pine veneer.

Example 28—Attempted Production of Manufactured Wood Product with Veneers Having a High Moisture Content A block was made according to the method in Example 11, but without drying the excess moisture from the veneer pieces prior to moulding. The block was still moist and flexible on removal from the mould and the pieces of veneer did not adhere to each other.

This example shows that very high moisture content is undesirable

Example 29—Production of Manufactured Wood Product with Post-Heat Treatment after Hot-Release A block was made using the method in Example 1, but with *Eucalyptus grandis* wood, and then post-heated in an oven at 140° C. for 2 hours. The block retained its monolithic shape.

Figure 7:
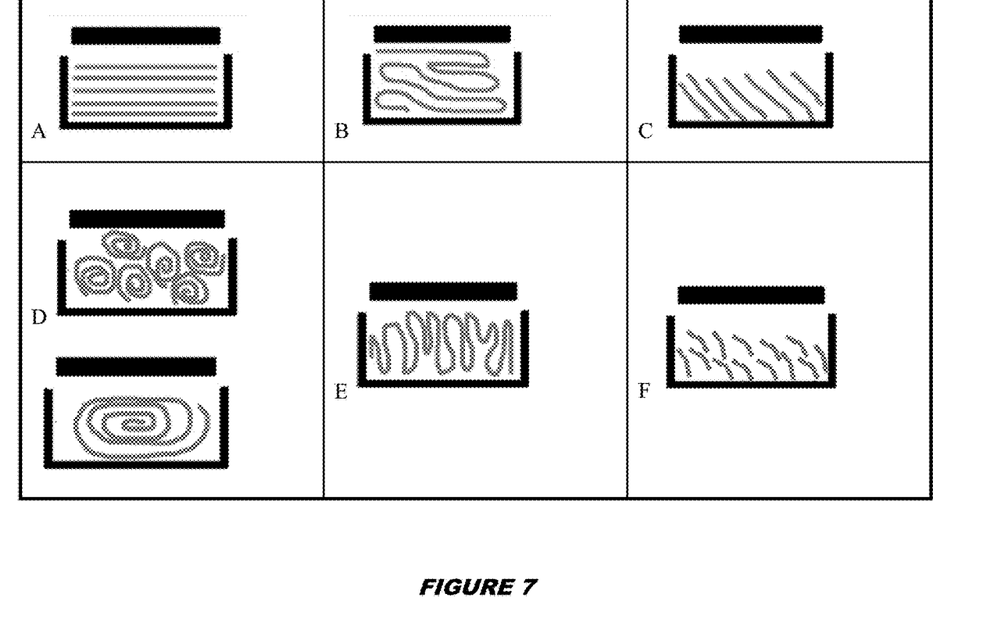
FIG. 7 shows different orientations of wood pieces in a mould used in the Examples.

Examples 30-35—Production of Manufactured Wood Product Using Different Orientation of Veneers Veneers were oriented in different ways in mould, as shown in FIG. 7. Using the method in Example 1 blocks were made using various orientations of veneer in the mould. Example 1 was oriented as in FIG. 7C, Examples 30 and 31 were oriented as in FIG. 7A, Examples 32 and 34 were oriented as in FIG. 7E, Example 33 was oriented as in FIG. 7D and Example 35 was oriented as in FIG. 7F.

These examples show the mechanical properties (density and hardness) are substantially not influenced by the orientation of veneers (Table 3), although the visual appearance on the flat upper face, or a cut surface along the length of the block, is strongly influenced.

TABLE 2

Physical and mechanical properties of blocks of manufactured wood product produced according to the Examples (Ex # refers to Example number)

| Ex # | Sample Description | Hold Shape | Boil Test | % Swell y axis | % Swell z axis | Density (g/cm3) | Hardness Janka (5 mm) | MOE | MOR |
|---|---|---|---|---|---|---|---|---|---|
| 1 | Bluegum, TB3 | Pass | Pass | 12.3 | 29.4 | 0.95 | 1.50 | 16780 | 175 |
| 2 | Bluegum, Aquadhere | Pass | Fail | | | | | | |
| 3 | Bluegum, AQ+ | Pass | Fail | | | | | | |
| 4 | Bluegum, AVXL+ | Pass | Fail | | | 1.12 | 2.2 | | |
| 5 | Bluegum, KL1999 | Pass | Fail | | | 0.93 | | 16193 | 158 |
| 6 | Bluegum, DLAU7 | Pass | Pass | | | 1.18 | 1.48 | 14478 | 159 |
| 7 | Bluegum, KL325 | Pass | Pass | | | 0.85 | | 9466 | 99 |
| 8 | Bluegum, UK5400 | Pass | Pass | | | 0.98 | 1.95 | 17017 | 212 |
| 9 | Bluegum, TB3 + 2.5% glyoxal | Pass | Pass | 10.1 | 16.4 | 0.94 | 1.54 | | |
| 10 | Bluegum, , TB3 + 2.5% glutaraldehyde | Pass | Pass | 10.0 | 17.0 | 0.94 | 1.24 | | |
| 11 | Pine, TB3 | Pass | Pass | 11.7 | 23.0 | 0.85 | 0.85 | | |
| 12 | Pine, Aquadhere | Pass | Fail | | | | | | |
| 13 | Pine, UK5400 | Pass | Pass | | | 0.76 | 1.39 | 6858 | 70 |
| 14 | Bluegum, KL442 | Fail | | | | | | | |
| 15 | Pine, 5% Glyoxal, TB3 | Pass | Pass | 9.1 | 21.2 | | | | |
| 16 | Pine, TB3 + 5% glyoxal, 40 min press | Pass | Pass | 14.5 | 29.6 | | | | |
| 17 | Pine, TB3 + 5% glyoxal, 40 min press + post-cure 2 H 130 C. | Pass | Pass | 13.6 | 20.7 | | | | |
| 18 | Bamboo | Pass | Pass | | | 1.13 | 2.09 | 9020 | 136 |
| 19 | Blackbutt | Pass | Pass | | | 1.27 | 1.82 | 14343 | 196 |
| 20 | Red Maple | Pass | | | | | | | |
| 21 | Tasmanian Oak, | Pass | Pass | | | 0.85 | 1.33 | 13440 | 173 |
| 22 | *Eucalyptus Grandis* | Pass | Pass | | | 0.73 | 0.60 | 8161 | 96 |
| 23 | Aspen | Pass | | | | | | | |
| 24 | Blackbutt thick pieces | Fail | Fail | | | | | | |
| 25 | No heating in press | Pass | Pass | | | 0.90 | 1.40 | | |
| 26 | Cool in press, Bluegum | Pass | Pass | | | 1.16 | 2.18 | | |
| 27 | Cool in press, *Eucalyptus Grandis* | Pass | Pass | | | 1.05 | 2.93 | | |
| 28 | High moisture content | Fail | | | | | | | |
| 29 | Post heat treatment | Pass | Pass | | | | | | |

Note:
"Hold Shape" means hold the monolithic compressed shape after removal from the mould; "Boil Test" means substantially hold shape and not fall apart or crack significantly during 3 hour water boil; MOE is modulus of elasticity and MOR is modulus of rupture.

TABLE 3

Effect of variation of orientation of wood veneers in mould on hardness and density (Ex # refers to Example number)

| Ex # | Sample Description | Density (g/cm3) | Hardness Janka (5 mm) |
|---|---|---|---|
| 1 | Bluegum, hot release, TB3 45 degree | 0.938 | 1.505 |
| 30 | blue gum, hot release, TB3 flat oriented | 0.897 | 1.323 |
| 31 | blue gum, hot release, TB3 flat oriented, larger | 0.927 | 1.526 |
| 32 | blue gum, hot release, TB3 sinewave oriented | 0.892 | 1.314 |
| 33 | blue gum, hot release, TB3 coil oriented | 0.955 | 1.194 |
| 34 | blue gum, hot release, TB3 sinewave oriented 2 | 0.968 | 1.369 |
| 35 | blue gum, hot release, TB3 small pieces | 0.967 | 1.447 |

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the disclosure is not restricted in its use to the particular application described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions without departing from the scope of the disclosure as set forth and defined by the following claims.

The invention claimed is:

1. A process of producing a manufactured wood product comprising:
   providing a plurality of wood pieces having substantially an equilibrium moisture content;
   contacting the plurality of wood pieces with one or more additives under conditions for the additive(s) to soak into the wood pieces;
   applying a thermoplastic adhesive comprising a thermoplastic resin and a crosslinking agent to the wood pieces to form adhesive coated wood pieces;
   optionally heating the adhesive coated wood pieces to form heated adhesive coated wood pieces;
   assembling the adhesive coated wood pieces in a desirable configuration to form assembled adhesive coated wood pieces;
   compressing the assembled adhesive coated wood pieces in a press at a pressure and for a time sufficient to compact and compress the assembled wood pieces to force trapped air out of and mechanically deform the assembled adhesive coated wood pieces so that adjacent wood pieces conform to the shape of one another;
   crosslinking the thermoplastic adhesive to at least a critical crosslinking amount during the compression step to form an at least partially cured manufactured wood product, wherein the critical crosslinking amount is sufficient such that the at least partially cured manufactured wood product substantially maintains its compressed form and prevents the wood pieces expanding and returning to their initial state upon release of pressure in the compression step;
   removing the at least partially cured manufactured wood product from the press; and
   optionally, further curing the partially cured manufactured wood product to provide the manufactured wood product having substantially an equilibrium moisture content.

2. The process according to claim 1, wherein a veneer profile of each of the assembled wood pieces after compression is different to the veneer profile of each of the assembled wood pieces prior to compression.

3. The process according to claim 1, wherein the adhesive coated wood pieces are preheated prior to assembling them in a desirable configuration and compressing.

4. The process according to claim 1, wherein the cross-linked thermoplastic adhesive in the manufactured wood product has a glass transition temperature at or lower than the normal use temperature of the manufactured wood product.

5. The process according to claim 1, wherein the thermoplastic resin is polyvinyl acetate or a hydrolyzed form thereof.

6. The process according to claim 5, wherein the cross-linking agent is selected from the group consisting of aluminum chloride and p-toluene sulfonic acid.

7. The process according to claim 1, wherein the assembled wood pieces are compressed to a pressure of about 4 to 20 MPa.

8. The process according to claim 1, wherein the cross-linking is initiated by heating during the compression step.

9. The process according to claim 1, wherein the at least partially-cured manufactured wood product is released from the mould whilst it is still warm.

10. The process according to claim 1, wherein the wood for the wood pieces is selected from the group consisting of eucalypt, pine, red maple, Queensland maple, ash, aspen, walnut, oak, redwood, birchwood, mahogany, ebony, cherry wood, oregon, poplar and grasses.

11. The process according to claim 1, wherein the one or more additives are selected from the group consisting of swell control agents, fungicides, insecticides, coloring agents, UV stabilizers, fillers, extenders, fire resistant agents, fire retardants, and fibers.

12. A process of producing a manufactured wood product comprising:
   providing a plurality of wood pieces having substantially an equilibrium moisture content;
   applying a thermoplastic adhesive comprising a thermoplastic resin and a crosslinking agent to the wood pieces to form adhesive coated wood pieces;
   optionally heating the adhesive coated wood pieces to form heated adhesive coated wood pieces;
   assembling the adhesive coated wood pieces in a mould or a press having a length, wherein a majority of the wood pieces are assembled with the fibre direction of the wood pieces substantially aligned with the length of the mould or press to form assembled adhesive coated wood pieces;
   compressing the assembled adhesive coated wood pieces in a press in a direction and at a pressure and for a time sufficient to compact and compress the assembled wood pieces to force trapped air out of and mechanically deform the assembled adhesive coated wood pieces so that adjacent wood pieces conform to the shape of one another and alter the configuration of the wood pieces in the compressed block such that the wood pieces within the compressed block are in a different configuration to that of the assembled wood pieces;

crosslinking the thermoplastic adhesive to at least a critical crosslinking amount during the compression step to form an at least partially cured manufactured wood product, wherein the critical crosslinking amount is sufficient such that the at least partially cured manufactured wood product substantially maintains its compressed form and prevents the wood pieces expanding and returning to their initial state upon release of pressure in the compression step;

removing the at least partially cured manufactured wood product from the press; and optionally, further curing the partially cured manufactured wood product to provide the manufactured wood product having substantially an equilibrium moisture content.

13. The process according to claim 12, wherein a veneer profile of each of the assembled wood pieces after compression is different to the veneer profile of each of the assembled wood pieces prior to compression.

14. The process according to claim 12, wherein the adhesive coated wood pieces are preheated prior to assembling them in a desirable configuration and compressing.

15. The process according to claim 12, wherein the crosslinked thermoplastic adhesive in the manufactured wood product has a glass transition temperature at or lower than the normal use temperature of the manufactured wood product.

16. The process according to claim 12, wherein the thermoplastic resin is polyvinyl acetate or a hydrolyzed form thereof.

17. The process according to claim 16, wherein the crosslinking agent is selected from the group consisting of aluminum chloride and p-toluene sulfonic acid.

18. The process according to claim 12, wherein the assembled wood pieces are compressed to a pressure of about 4 to 20 MPa.

19. The process according to claim 12, wherein the crosslinking is initiated by heating during the compression step.

20. The process according to claim 12, wherein the at least partially-cured manufactured wood product is released from the mould whilst it is still warm.

* * * * *